United States Patent
Schott et al.

(10) Patent No.: US 11,427,039 B2
(45) Date of Patent: Aug. 30, 2022

(54) METHOD FOR ADAPTING A TIRE INFLATION PRESSURE OF AN AGRICULTURAL VEHICLE

(71) Applicant: DEERE & COMPANY, Moline, IL (US)

(72) Inventors: Florian Schott, Einhausen (DE); Bernd Baum, Dannstadt-Schauernheim (DE)

(73) Assignee: DEERE & COMPANY, Moline, IL (US)

( * ) Notice: Subject to any disclaimer, the term of this patent is extended or adjusted under 35 U.S.C. 154(b) by 442 days.

(21) Appl. No.: 16/750,718

(22) Filed: Jan. 23, 2020

(65) Prior Publication Data
US 2020/0254829 A1 Aug. 13, 2020

(30) Foreign Application Priority Data

Feb. 11, 2019 (DE) .......................... 102019201743.6

(51) Int. Cl.
| | |
|---|---|
| *H04N 5/44* | (2011.01) |
| *B60C 23/00* | (2006.01) |
| *A01B 79/00* | (2006.01) |
| *B60C 23/04* | (2006.01) |
| *G01C 21/20* | (2006.01) |

(52) U.S. Cl.
CPC .......... *B60C 23/002* (2013.01); *A01B 79/005* (2013.01); *B60C 23/0479* (2013.01); *G01C 21/20* (2013.01)

(58) Field of Classification Search
CPC .............. B60C 23/002; B60C 23/0479; B60C 2200/08; A01B 79/005; G01C 21/20
See application file for complete search history.

(56) References Cited

U.S. PATENT DOCUMENTS

| | | | |
|---|---|---|---|
| 7,302,837 | B2 | 12/2007 | Wendte |
| 8,589,049 | B2 | 11/2013 | Craig |
| 8,843,269 | B2 | 9/2014 | Anderson et al. |
| 10,442,256 | B2 | 10/2019 | Baum et al. |
| 10,562,358 | B2 | 2/2020 | Baum et al. |
| 10,676,141 | B2 | 6/2020 | Schott et al. |
| 2005/0102073 | A1 | 5/2005 | Ingram, II |
| 2013/0046419 | A1 | 2/2013 | Anderson et al. |

(Continued)

FOREIGN PATENT DOCUMENTS

| | | |
|---|---|---|
| DE | 102011085041 A1 | 4/2013 |
| DE | 102016203689 A1 | 9/2017 |
| WO | WO 2020035101 A1 | 2/2020 |

OTHER PUBLICATIONS

European Search Report issued in European Patent Application No. 20155206.4, dated Jun. 9, 2020, 7 pages.

*Primary Examiner* — Munear T Akki

(57) ABSTRACT

A method for adapting a tire inflation pressure of an agricultural vehicle includes ascertaining a current vehicle position by a navigation system, correlating the current vehicle position by a control unit with a cartographically captured field boundary, detecting a travel-induced entry into a cultivation region surrounded by a field boundary, and selecting a set tire inflation pressure designated for field cultivation from a database by the control unit. The method further includes applying the selected set tire inflation pressure to at least one tire of the agricultural vehicle by a tire-pressure regulating system.

20 Claims, 6 Drawing Sheets

(56) References Cited

U.S. PATENT DOCUMENTS

| | | | |
|---|---|---|---|
| 2014/0034202 A1* | 2/2014 | Voith | B60C 23/00372 |
| | | | 152/415 |
| 2014/0107889 A1* | 4/2014 | Pierfelice | B60W 30/02 |
| | | | 701/36 |
| 2015/0290985 A1* | 10/2015 | Martin | B60C 23/001 |
| | | | 701/1 |
| 2017/0105333 A1* | 4/2017 | Glenn | B60C 23/00336 |
| 2017/0113497 A1* | 4/2017 | Schott | B60C 23/002 |
| 2017/0217261 A1* | 8/2017 | Mays | B60C 23/0486 |
| 2017/0253093 A1 | 9/2017 | Baum et al. | |
| 2017/0253094 A1* | 9/2017 | Baum | B60C 23/0401 |
| 2019/0023088 A1* | 1/2019 | Toth | B60C 23/0479 |
| 2019/0187027 A1* | 6/2019 | Lin | B60C 23/0408 |
| 2019/0219489 A1* | 7/2019 | Ki | G01N 3/42 |
| 2019/0308471 A1* | 10/2019 | Fiorati | B62D 49/0621 |

\* cited by examiner even though US 11,427,039 B2

METHOD FOR ADAPTING A TIRE INFLATION PRESSURE OF AN AGRICULTURAL VEHICLE

RELATED APPLICATIONS

This application claims priority to German Patent Application Ser. No. 102019201743.6, filed Feb. 11, 2019, the disclosure of which is hereby incorporated by reference in its entirety.

FIELD OF THE DISCLOSURE

The present disclosure relates to a method for adapting a tire inflation pressure of an agricultural vehicle.

BACKGROUND

Conventional methods of such a type are increasingly finding wide application in agricultural vehicles for the purpose of soil protection. The actual adaptation of the tire inflation pressure is undertaken by means of a tire-pressure regulating system arranged in the agricultural vehicle. This system ordinarily consists of a compressor or a compressed-air reservoir supplied therefrom, in which case a valve device located downstream of the compressor or compressed-air reservoir permits the application of a desired tire inflation pressure to one or more tyres of the agricultural vehicle.

SUMMARY

In the present disclosure, a method for adapting a tire inflation pressure of an agricultural vehicle provides that a current vehicle position is ascertained by means of a navigation system and is correlated with a cartographically captured field boundary by a control unit. In this regard, upon detection of a travel-induced entry into a cultivation region surrounded by the field boundary a set tire inflation pressure designated for field cultivation is selected from a database by the control unit, the selected set tire inflation pressure being applied to at least one tire of the agricultural vehicle by means of a tire-pressure regulating system at the instigation of the control unit. For the purpose of lessening the compaction of the soil, this occurs, in particular, immediately after a transport journey by partial venting of the air located in the at least one tire.

The passing through the field boundary consequently constitutes the trigger for an appropriate adaptation of the tire inflation pressure, starting from a level designated for a preceding transport journey. The claimed procedure takes into account the computer-assisted preparation for work that is customary for modern agricultural users, since the cartographic planning of the cultivation regions and also the assignment of suitable values of the set tire inflation pressure can be undertaken in advance on the basis of comprehensive agronomic information. The presets or default settings carried out in such a way can subsequently be uploaded into the database, so that they are immediately available in the agricultural vehicle during the implementation of the actual cultivation operation. The agricultural vehicle may be, for instance, an agricultural tractor, a harvesting machine, a forage harvester, a self-driving field-sprayer or such like.

In one embodiment, the set tire inflation pressure designated for field cultivation or for implementation of the transport journey has been permanently predetermined. The default setting can be undertaken manually within the scope of the aforementioned preparation for work, and may be based on appropriate experiences of the user, or on agronomic information known to the user. On the other hand, values of the set tire inflation pressure predetermined at the factory may also have been saved in the database. In this case, the values have been chosen in such a manner that they conform to generally customary transport situations or cultivation situations.

The fixed default setting of the set tire inflation pressure ultimately represents a compromise simplifying the processing of the data. If more exacting demands are made with regard to a situation-compliant adaptation of the tire inflation pressure, there may also be provision that the set tire inflation pressure designated for field cultivation or for implementation of the transport journey is modified with regard to external influencing variables. This may be, in particular, an actual or current axle-load distribution of the agricultural vehicle, a roadway condition, an outside temperature, weather conditions, a soil condition, a topography, intended soil-cultivation measures, the type of an attached add-on implement or cultivation implement, or a type of tire. The collection of data required for this can be undertaken, in particular, within the scope of a self-learning process as presented in DE 10 2016 203 689 A1.

Furthermore, there is the possibility that a central data server is accessed in a wireless manner by the control unit for the purpose of selecting from the database the set tire inflation pressure to be applied. In such a case, not only the saving of the values predetermined for the set tire inflation pressure but also the default setting thereof or the modification thereof carried out with regard to external influencing variables occur outside the agricultural vehicle. As a result, this leads to a lessening of the computing and storage capacities to be held in reserve by the agricultural vehicle within the scope of its controller architecture.

In order to avoid the implementation of unnecessary pressure-regulating operations, it is conceivable that in the case where first and second field boundaries form cultivation regions overlapping one another the applied tire inflation pressure is retained by the control unit, provided that, on the basis of the current vehicle position or the preceding course thereof, it is detected, in particular by extrapolation of the travel trajectory situated ahead, that the agricultural vehicle is passing through the field boundaries without foreseeably leaving the cultivation regions overlapping one another. An extrapolation of the travel trajectory situated ahead is possible in comparatively reliable manner, since it is to be assumed that the agricultural vehicle will not execute any sudden or unforeseeable changes of direction upon changing from the one to the other cultivation region.

Accordingly, there may also be provision that in the case where first and second field boundaries form cultivation regions spaced apart from one another the applied tire inflation pressure is retained by the control unit, provided that, on the basis of the current vehicle position or the preceding course thereof, it is detected, in particular by extrapolation of the travel trajectory situated ahead, that the agricultural vehicle is leaving the first field boundary, travelling in the direction of the second field boundary, and that the travel-time required for this is less than or equal to a given time for inflating the at least one tire. This inflating-time is specific to the tire-pressure regulating system being used, and also to the type of tire in question, and may have been saved as an appropriate constant in the database or in the control unit. The requisite travel-time, on the other hand, can be estimated by the control unit from the distance to be travelled between the two field boundaries along the travel trajectory situated ahead and also from the travel-speed progression to be expected in this regard.

Conversely, there is the possibility that in the case where, on the basis of the current vehicle position or the preceding course thereof, it is detected by extrapolation of the travel trajectory situated ahead, that the agricultural vehicle is leaving the cultivation region, travelling in the direction of a transport path, a set tire inflation pressure designated for the implementation of a transport journey is selected from the database and is applied to the at least one tire for the purpose of (re)inflation. The transport path situated ahead may in this case have been categorized with regard to the use of a suitable tire inflation pressure. In this way, a distinction can be made between a transport journey on a surfaced asphalt road and a transport journey on an unsurfaced field path. The location and course of the transport path situated ahead may in this case likewise have been captured cartographically and saved in the database for the purpose of correlation with the current vehicle position.

In order to rule out unnecessary soil damage, or to avoid losses of time by reason of pressure-regulating operations to be executed in advance upon reaching the cultivation region, it is conceivable that the set tire inflation pressure is applied by the control unit upon detection of a travel-induced entry to be expected into a cultivation region surrounded by the field boundary, looking ahead in accordance with a venting-time given by the tire-pressure regulating system. The venting-time is specific to the tire-pressure regulating system being used and may have been saved as an appropriate constant in the database.

For the purpose of improving the comfort of the operator, the selected set tire inflation pressure can be applied in an automated manner by the control unit, in particular after prior enabling by a user or driver. In the latter case it is ensured that the pressure-regulating operation does not occur in surprising manner for the user or driver.

Corresponding to present-day user practices, in addition it is possible that the enabling is undertaken by means of a mobile terminal communicating with the control unit via a WLAN connection or Wi-Fi connection. The mobile terminal is typically a smartphone or a tablet. The terminal may, for instance, have been fitted in a driver's cab of the agricultural vehicle by means of a detachable bracket.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
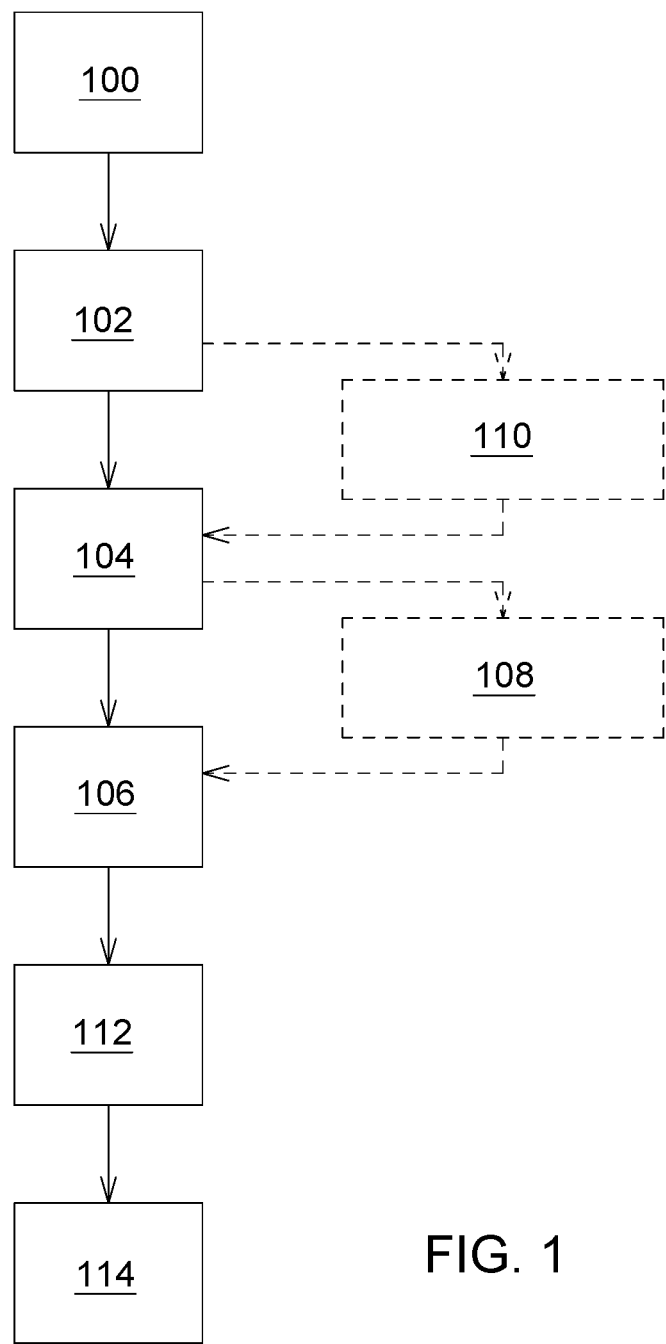
FIG. 1 shows an embodiment of a method for adapting a tire inflation pressure of an agricultural vehicle.

FIG. 1 shows a schematically represented embodiment of a method according to the present disclosure for adapting a tire inflation pressure of an agricultural vehicle. This method will be described below with reference to the networked system represented in FIG. 2.

Figure 2:
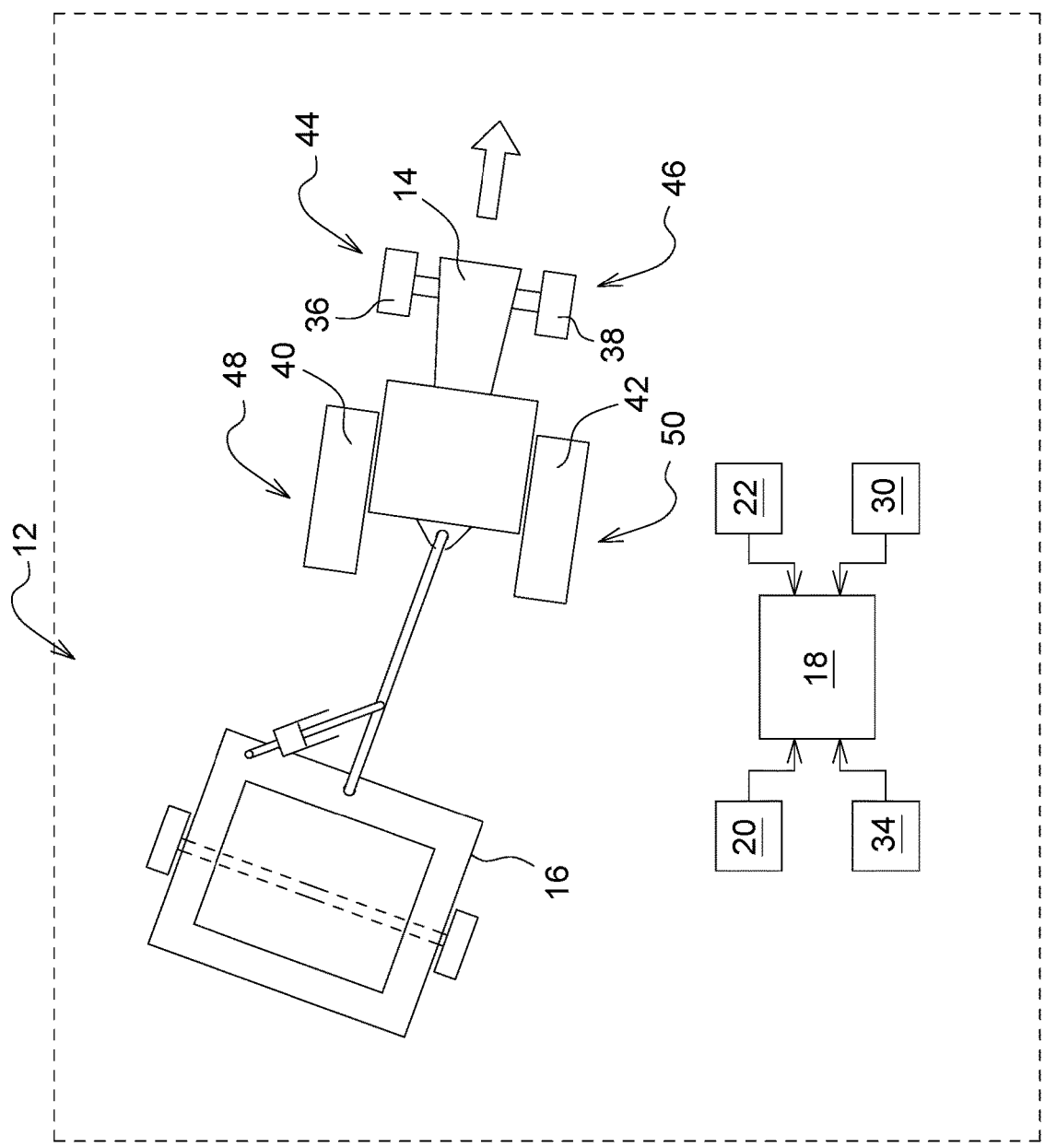
FIG. 2 shows a networked system provided for executing the method of FIG. 1, with an agricultural vehicle.
Figure 2:
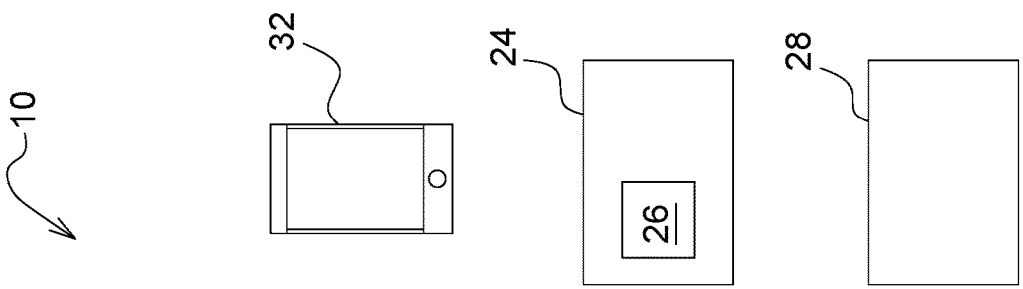

According to FIG. 2, the networked system 10 may include an agricultural vehicle 12 such as an agricultural tractor 14 with an add-on implement or cultivation implement 16 attached thereto. Moreover, the system 10 may further include a control unit 18 fixed to the vehicle, which communicates with a satellite-aided navigation system 20 for ascertaining a current vehicle position and also, in wireless manner via a mobile-radio interface 22, with a database 26 encompassed by a central data server 24, or with an external data-provider 28. Besides this, a WLAN connection or Wi-Fi connection, for instance to a mobile terminal 32 in the form of a smartphone or a tablet which has been fitted in a driver's cab of the agricultural vehicle 12 by means of a detachable bracket, can be established via a further data interface 30.

A tire-pressure regulating system 34, not represented in any detail, permits a desired tire inflation pressure to be applied to one or more tires 36, 38, 40, 42 of the agricultural vehicle 12. The application is undertaken for each axle or for individual wheels in respect of associated front wheels 44, 46 or rear wheels 48, 50 of the agricultural vehicle 12.

The method taking place in the processor-controlled control unit 18 is initialized, according to FIG. 1, in a starting step 100 upon start-up of the agricultural vehicle 12. After this, in a first main step 102 the current vehicle position is ascertained by means of the navigation system 20 and is correlated by the control unit 18 with cartographically captured field boundaries saved in the database 26.

Depending upon the working situation in which the agricultural vehicle 12 is to be found, the further procedure is now variable.

First Working Situation

Figure 3:
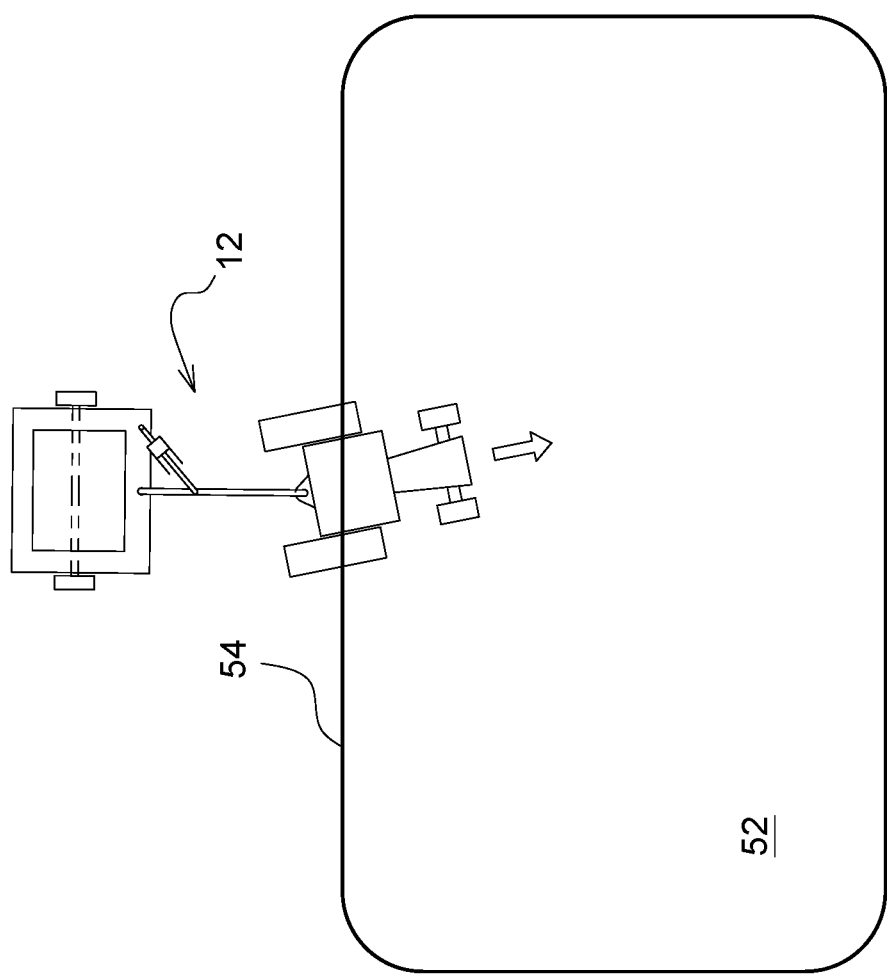
FIG. 3 shows a first working situation, in which the agricultural vehicle is entering a first cultivation region immediately after a transport journey.

FIG. 3 shows a first working situation, in which, immediately after a transport journey, the agricultural vehicle 12 is entering a first cultivation region 52 in the form of a field to be cultivated.

As can be discerned, the first cultivation region 52 in the present case is surrounded by an associated first field boundary 54, or is defined by the latter. Therefore if the control unit 18 detects in the first main step 102 that the agricultural vehicle 12 is entering the first cultivation region 52 in travel-induced manner by passing through the first field boundary 54, proceeding from a transport journey, in a following second main step 104 a set tire inflation pressure designated for field cultivation is selected from the database 26 by the control unit 18.

Subsequently, in a third main step 106 the selected set tire inflation pressure is applied in automated manner to at least one tire 36, 38, 40, 42 of the agricultural vehicle 12 by the tire-pressure regulating system 34 at the instigation of the control unit 18. This is effected by partial venting of the air located in the at least one tire 36, 38, 40, 42 for the purpose of lessening the compaction of the soil.

The selected set tire inflation pressure is optionally applied by the control unit 18 in the third main step 106 only after prior enabling by a user or driver. The enabling is undertaken in an intermediate step 108 by means of the mobile terminal 32 communicating via the WLAN connection or Wi-Fi connection.

The passing through the field boundary 54 consequently constitutes the trigger for an appropriate adaptation of the tire inflation pressure, starting from a level designated for the preceding transport journey.

In the simplest case, the set tire inflation pressure designated for field cultivation or for implementation of the transport journey has been permanently predetermined. The default setting is undertaken manually and is based on appropriate experiences of the user, or on agronomic information known to the user. Alternatively, values of the set tire inflation pressure predetermined at the factory have been saved in the database 26. In this case, the values have been predetermined in such a manner that they conform to generally customary transport situations or cultivation situations.

The fixed default setting of the set tire inflation pressure ultimately represents a compromise simplifying the processing of the data. If more exacting demands are made with regard to a situation-compliant adaptation of the tire inflation pressure, there is optionally provision that in a further intermediate step 110, positioned upstream of the second main step 104, the set tire inflation pressure designated for field cultivation or for implementation of the transport journey is modified with regard to external influencing variables, in particular an actual or current axle-load distribution of the agricultural vehicle 12, a roadway condition, an outside temperature, weather conditions, a soil condition, a topography, intended soil-cultivation measures, the type of the attached add-on implement or cultivation implement 16, or a type of tire. The collection of data required for this is undertaken, in particular, within the scope of a self-learning process as described in DE 10 2016 203 689 A1. The modification is undertaken either by the control unit 18 or alternatively by the external data-provider 28, from where the modified values are uploaded in each instance into the database 26 of the central data server 24.

In order to rule out unnecessary soil damage, or to avoid losses of time by reason of pressure-regulating operations to be executed in advance upon reaching the cultivation region 52, optionally in the third main step 106 the set tire inflation pressure is applied by the control unit 18 upon detection of a travel-induced entry, to be expected, into the cultivation region 52 surrounded by the field boundary 54, looking ahead in accordance with a venting-time given by the tire-pressure regulating system 34. The venting-time is specific to the tire-pressure regulating system 34 being used and has been saved as an appropriate constant in the database 26.

Second Working Situation

Figure 4:
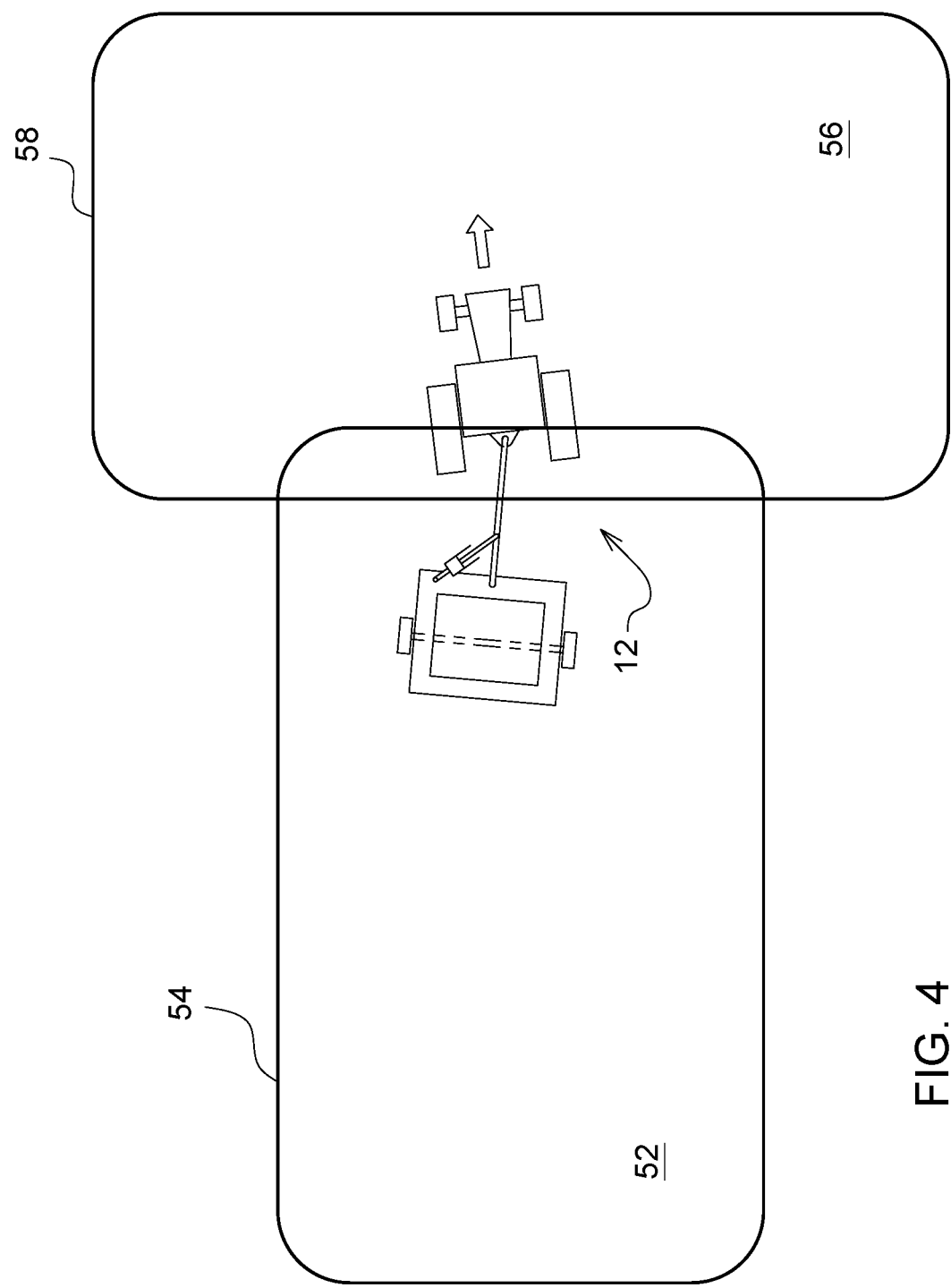
FIG. 4 shows a second working situation, with first and second cultivation regions overlapping one another.

FIG. 4 shows a second working situation, with first and second cultivation regions 52, 56 overlapping one another in the form of fields to be cultivated in succession, the fields being surrounded by first and second field boundaries 54, 58.

In order to avoid the implementation of unnecessary pressure-regulating operations, under such conditions the applied tire inflation pressure is then retained by the control unit 18 in a fourth main step 112, provided that, on the basis of the current vehicle position or the preceding course thereof, it is detected, in particular by extrapolation of the travel trajectory situated ahead, that the agricultural vehicle 12 is passing through the field boundaries 54, 58 without foreseeably leaving the cultivation regions 52, 56 overlapping one another. An extrapolation of the travel trajectory situated ahead is possible in comparatively reliable manner, since it is to be assumed that the agricultural vehicle 12 will not execute any sudden or unforeseeable changes of direction upon changing from the one to the other cultivation region 52, 56.

Third Working Situation

Figure 5:
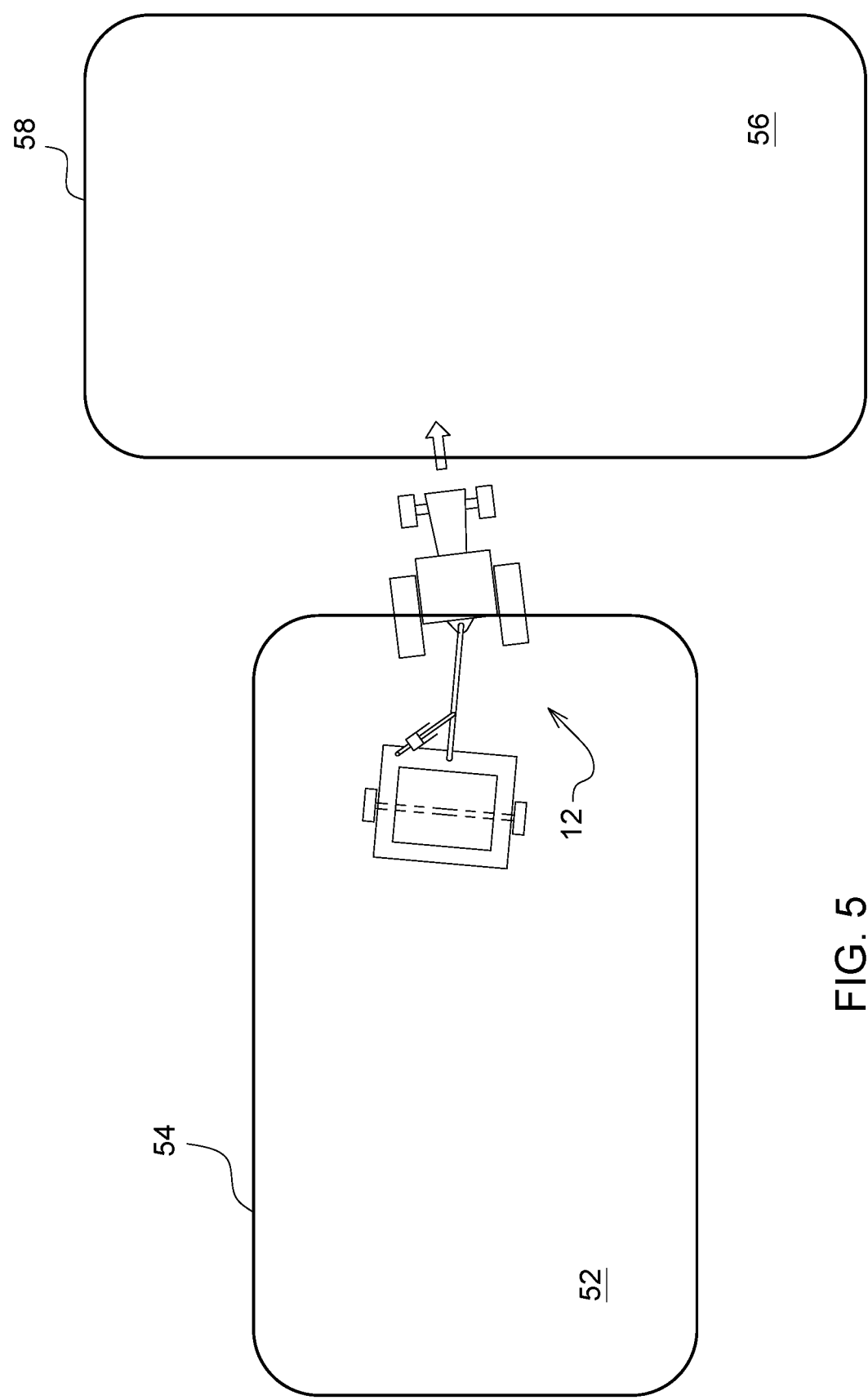
FIG. 5 shows a third working situation, with first and second cultivation regions spaced apart from one another.

FIG. 5 shows a third working situation, with first and second cultivation regions 52, 56 spaced apart from one another in the form of fields to be cultivated in succession, the fields being surrounded by first and second field boundaries 54, 58.

In such a case, in the fourth main step 112 the applied tire inflation pressure is retained by the control unit 18, provided that, on the basis of the current vehicle position or the preceding course thereof, it is detected, in particular by extrapolation of the travel trajectory situated ahead, that the agricultural vehicle 12 is leaving the first field boundary 54, travelling in the direction of the second field boundary 58, and that the travel-time required for this is less than or equal to a given time for inflating the at least one tire 36, 38, 40, 42. This inflating-time is specific to the tire-pressure regulating system 34 being used, and also to the type of tire in question, and has been saved as an appropriate constant in the database 26 or in the control unit 18. The requisite travel-time, on the other hand, is estimated by the control unit 18 from the distance to be travelled between the two field boundaries 54, 58 along the travel trajectory situated ahead and also from the travel-speed progression to be expected in this regard.

Fourth Working Situation

Figure 6:
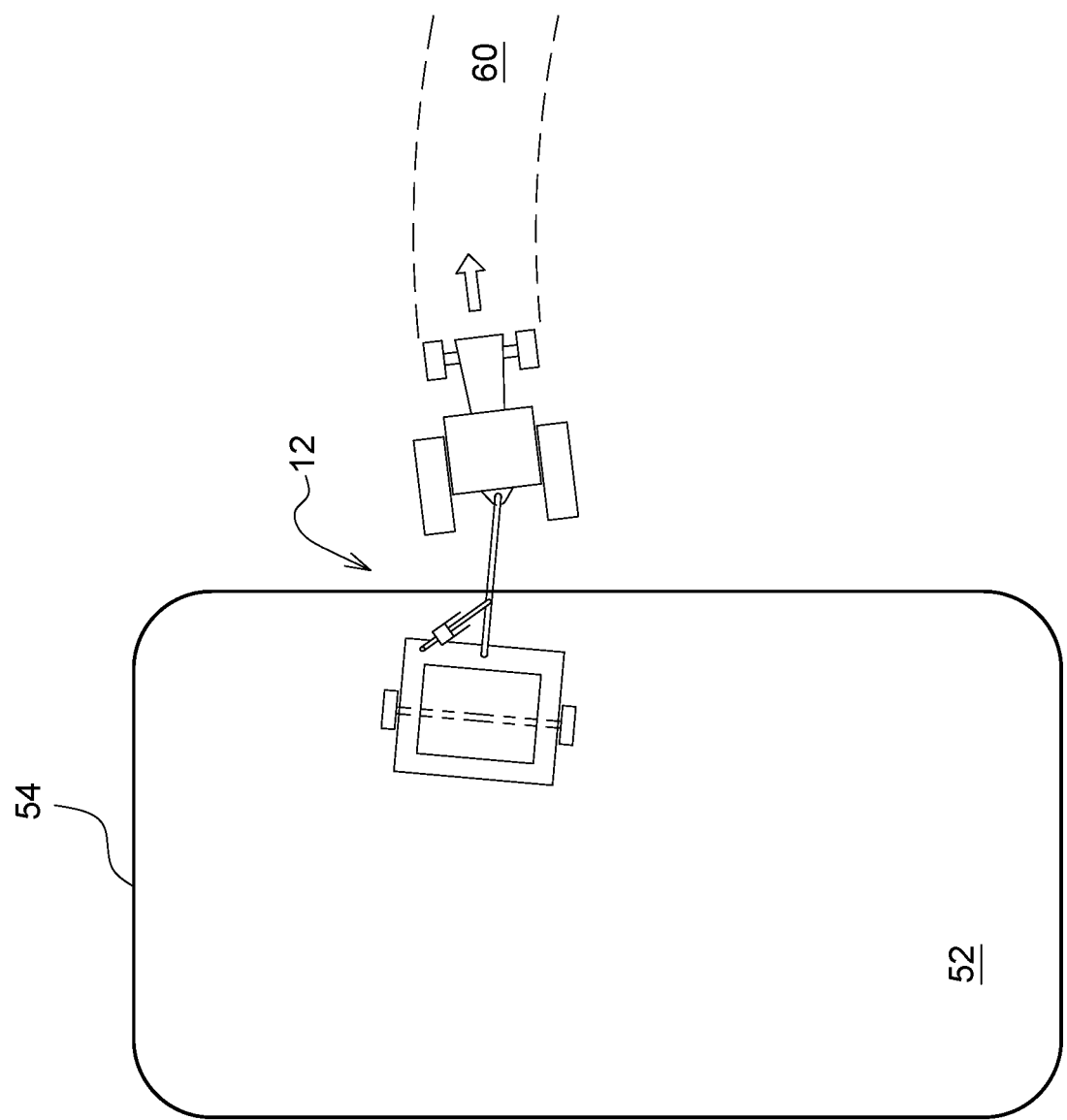
FIG. 6 shows a fourth working situation, in which the agricultural vehicle is leaving the first cultivation region, embarking upon a subsequent transport journey.

FIG. 6 shows a fourth working situation, in which the agricultural vehicle 12 is leaving the first cultivation region 52, embarking upon a subsequent transport journey.

For such a case, in which, on the basis of the current vehicle position or the preceding course thereof, it is detected, in particular by extrapolation of the travel trajectory situated ahead, that the agricultural vehicle 12 is leaving the cultivation region 52, travelling in the direction of a transport path 60, a set tire inflation pressure designated for the implementation of a transport journey is selected from the database 26 by the control unit 18 and is applied for the purpose of (re)inflating the at least one tire 36, 38, 40, 42.

The transport path 60 situated ahead has in this case been categorized with regard to the use of a suitable tire inflation pressure. In this way, a distinction is made, in particular, between a transport journey on a surfaced asphalt road and a transport journey on an unsurfaced field path. The location and course of the transport path 60 situated ahead have in this case likewise been captured cartographically and saved in the database 26 for the purpose of correlation with the current vehicle position.

In a final step 114 following upon the fourth main step 112 the method is concluded, in order to begin again from the start.

The foregoing description relates, in simplifying manner, to an application of one and the same tire inflation pressure to all the tires 36, 38, 40, 42 of the agricultural vehicle 12. In fact, the tire inflation pressure to be applied may also be variable for each axle or for individual wheels, in which case such a necessity may arise, in particular, by reason of a differing set of tires on front wheels and rear wheels 44, 46, 48, 50 or by reason of a transverse inclination of the terrain to be cultivated or travelled along.

In addition, instead of an agricultural tractor 14 the agricultural vehicle 12 may equally well be a harvesting machine, a forage harvester, a self-driving field-sprayer or such like.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for adapting a tire inflation pressure of an agricultural vehicle, comprising:
   ascertaining via a navigation system a current vehicle position;
   correlating via a control unit the current vehicle position with a cartographically captured field boundary from a database;
   detecting via the control unit a travel-induced entry into a first cultivation region surrounded by a first field boundary;
   selecting via the control unit a set tire inflation pressure designated for field cultivation from the database; and
   applying via a tire-pressure regulating system the selected set tire inflation pressure designated for field cultivation to at least one tire of the agricultural vehicle.

2. The method according to claim 1, further comprising actuating via the control unit the tire-pressure regulating system to partially vent the at least one tire to the selected set tire inflation pressure designated for field cultivation based upon an expected entry into the first cultivation region.

3. The method according to claim 1, further comprising predetermining the set tire inflation pressure designated for field cultivation.

4. The method according to claim 1, further comprising modifying via the control unit the set tire inflation pressure designated for field cultivation with regard to one or more external influencing variables including a current axle-load distribution of the agricultural vehicle, a roadway condition, an outside temperature, a weather condition, a soil condition, a topography, intended soil-cultivation measures, a type of implement, and a type of tire.

5. The method according to claim 1, further comprising: accessing via a control unit the database of a central data server in a wireless manner.

6. The method according to claim 1, further comprising:
   detecting via the control unit when the agricultural vehicle passes between the first cultivation region surrounded by the first field boundary and a second cultivation region surrounded by a second field boundary, the first cultivation region overlapping the second cultivation region;
   retaining via the control unit the selected set tire inflation pressure designated for field cultivation when the agricultural vehicle passes between the first and second field boundaries.

7. The method according to claim 6, wherein the detecting step is executed on the basis of the current vehicle position or the preceding course thereof.

8. The method according to claim 6, wherein the detecting step comprises extrapolating the travel trajectory situated ahead.

9. The method according to claim 1, further comprising:
   detecting via the control unit when the agricultural vehicle leaves the first cultivation region defined by the first field boundary and travels in a direction of a second cultivation region defined by a second field boundary, the first and second cultivation regions spaced apart from one another; and
   retaining via the control unit the set tire inflation pressure designated for field cultivation in the at least one tire provided that a travel-time from the first field boundary to the second field boundary is less than or equal to a time for inflating the at least one tire to a set tire inflation pressure designated for the implementation of a transport journey.

10. The method according to claim 9, wherein the detecting step is executed on the basis of the current vehicle position or the preceding course thereof, and the detecting step comprises extrapolating the travel trajectory situated ahead.

11. The method according to claim 1, further comprising:
    detecting via the control unit the agricultural vehicle leaving the first cultivation region and travelling in a direction of a transport path on a basis of a current vehicle position or a preceding course thereof;
    selecting via the control unit a set tire inflation pressure designated for the implementation of a transport journey from the database; and
    inflating via the tire-pressure regulating system the at least one tire to the set tire inflation pressure designated for the implementation of a transport journey.

12. The method according to claim 11, further comprising modifying via the control unit the set tire inflation pressure designated for implementation of a transport journey with regard to one or more external influencing variables including a current axle-load distribution of the agricultural vehicle, a roadway condition, an outside temperature, a weather condition, a soil condition, a topography, intended soil-cultivation measures, a type of implement, and a type of tire.

13. The method according to claim 11, further comprising predetermining the set tire inflation pressure designated for implementation of a transport journey.

14. The method according to claim 1, further comprising enabling the control unit by a mobile terminal communicating with the control unit via a WLAN connection or Wi-Fi connection.

15. A method for adapting a tire inflation pressure of an agricultural vehicle, comprising:
    determining via a navigation system a current position of the agricultural vehicle;
    correlating via a control unit the current position in view of a first field boundary;
    detecting via the control unit an entry of the vehicle into a first cultivation region defined by the first field boundary;
    selecting via the control unit a first predetermined tire inflation pressure designated for a field cultivation configuration from a database; and
    actuating via the control unit a tire-pressure regulating system to partially vent at least one tire to the first predetermined tire inflation pressure.

16. The method according to claim 15, wherein the actuating step comprises partially venting the at least one tire based upon an expected entry into the first cultivation region.

17. The method according to claim 15, further comprising:
  detecting via the control unit when the agricultural vehicle passes between the first cultivation region defined by the first field boundary and a second cultivation region defined by a second field boundary, the first and second cultivation regions overlapping one another; and
  retaining via the control unit the first predetermined tire inflation pressure in the at least one tire when the agricultural vehicle passed between the first and second field boundaries.

18. The method according to claim 15, further comprising:
  detecting via the control unit when the agricultural vehicle leaves the first cultivation region defined by the first field boundary and travels in a direction of a second cultivation region defined by a second field boundary, the first and second cultivation regions spaced apart from one another; and
  retaining via the control unit the first predetermined tire inflation pressure in the at least one tire provided that a travel-time from the first field boundary to the second field boundary is less than or equal to a time for inflating the at least one tire to a second predetermined tire inflation pressure designated for a transport configuration.

19. The method according to claim 15, further comprising:
  detecting via the control unit the agricultural vehicle leaving the first cultivation region and travelling in a direction of a transport path;
  selecting via the control unit a second predetermined tire inflation pressure for a transport configuration from the database; and
  inflating via the tire-pressure regulating system the at least one tire to the second predetermined tire inflation pressure.

20. A method for controlling a tire inflation pressure of a tire on an agricultural vehicle, comprising:
  determining via a navigation system a current position of the agricultural vehicle;
  detecting via a control unit when the vehicle enters or exits the cultivation region;
  selecting via the control unit one of a first tire inflation pressure designated for a field cultivation configuration and a second tire inflation pressure designated for a transport configuration from a database; and
  actuating via the control unit the tire-pressure regulating system to change at least one tire to the first or second tire inflation pressure based on the current position of the agricultural vehicle and whether vehicle is operating in the field cultivation configuration or the transport configuration.

* * * * *